(12) United States Patent  
Rhoads

(10) Patent No.: US 6,567,534 B1  
(45) Date of Patent: *May 20, 2003

(54) METHODS AND SYSTEMS FOR WATERMARK PROCESSING OF LINE ART IMAGES

(75) Inventor: Geoffrey B. Rhoads, West Linn, OR (US)

(73) Assignee: Digimarc Corporation, Tualatin, OR (US)

( * ) Notice: Subject to any disclaimer, the term of this patent is extended or adjusted under 35 U.S.C. 154(b) by 277 days.

This patent is subject to a terminal disclaimer.

(21) Appl. No.: 09/626,985

(22) Filed: Jul. 27, 2000

Related U.S. Application Data

(60) Division of application No. 09/074,034, filed on May 6, 1998, now Pat. No. 6,449,377, which is a continuation-in-part of application No. 08/438,159, filed on May 8, 1995, now Pat. No. 5,850,481.
(60) Provisional application No. 60/082,228, filed on Apr. 16, 1998.

(51) Int. Cl.[7] .................................................. H04K 1/00
(52) U.S. Cl. ...................................... 382/100; 382/135
(58) Field of Search ................................. 382/100, 135, 382/232; 713/176; 380/210, 252, 287, 51, 54; 283/72, 85, 113, 901, 902

(56) References Cited

U.S. PATENT DOCUMENTS

| | | | | |
|---|---|---|---|---|
| 4,660,859 A | * | 4/1987 | Natesh ......................... | 283/70 |
| 5,374,976 A | * | 12/1994 | Spannenburg .............. | 355/201 |
| 5,772,249 A | | 6/1998 | Guex et al. | |
| 5,838,814 A | * | 11/1998 | Moore ......................... | 382/115 |
| 5,843,564 A | * | 12/1998 | Gasper et al. .............. | 428/211 |
| 6,081,345 A | * | 6/2000 | Curry .......................... | 358/1.9 |
| 6,086,706 A | | 7/2000 | Brassil et al. ................ | 156/277 |
| 6,104,812 A | * | 8/2000 | Koltai et al. .................. | 380/51 |

FOREIGN PATENT DOCUMENTS

| | | | | |
|---|---|---|---|---|
| DE | 29 43 436 A1 | * | 5/1981 | .......... G06K/19/06 |
| WO | WO 95/26274 A1 | * | 10/1995 | .......... B42D/15/10 |

OTHER PUBLICATIONS

Gruhl et al., "Information Hiding to Foil the Casual Counterfeiter, "*Proc. 2nd Int'l Workshop on Information Hiding*, Apr. 14–17, 1998, pp. 1–15.*

Boland, "Watermarking Digital Images for Copyright Protection," Fifth International Conf. on Image Processing and Its Applications, Conf. Publ. No. 410, pp. 326–330, 1995.

Gruhl, "Information Hiding to Foil the Casual Counterfeiter," Proc. 2d Information Hiding Workshop, LNCS vol. 1525, pp. 1–15, Apr., 1998.

* cited by examiner

*Primary Examiner*—Andrew W. Johns
(74) *Attorney, Agent, or Firm*—William Y. Conwell; Digimarc Corporation

(57) ABSTRACT

Binary data is embedded in banknote artwork, permitting later recovery by, and control of, compliant devices that may encounter banknote image data, such as photocopiers, scanners, and printers. One embedding method involves providing nominal line art for the banknote, and imposing a virtual grid of points over the art, thereby defining plural regions. The luminance of at least certain of these regions is changed to effect encoding of the binary data. The luminance may be changed, e.g., by changing the width or spacing of the artwork lines, or by introducing new lines into the artwork.

8 Claims, 3 Drawing Sheets

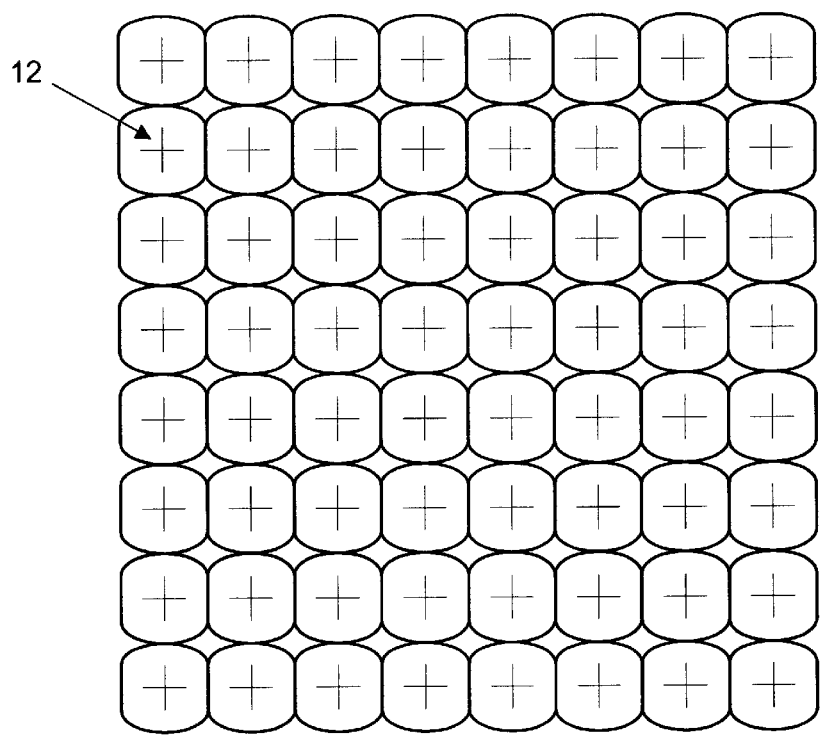
Fig. 3
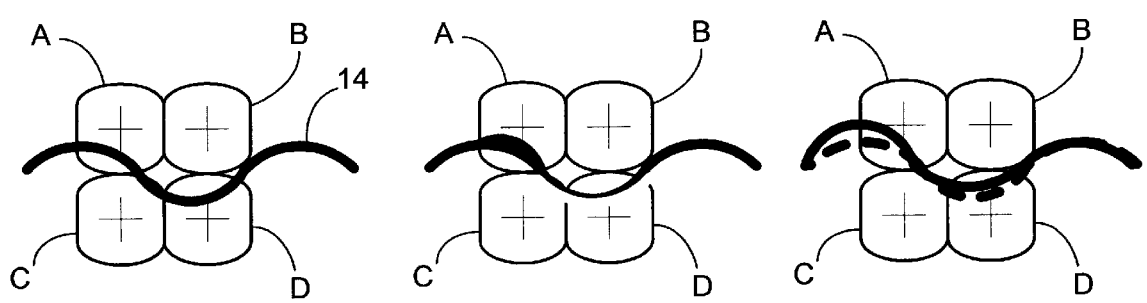
Fig. 4   Fig. 5   Fig. 6

METHODS AND SYSTEMS FOR WATERMARK PROCESSING OF LINE ART IMAGES

RELATED APPLICATION DATA

This application is a divisional of copending application 09/074,034, filed May 6, 1998 (U.S. Pat. No. 6,449,377), which is a continuation-in-part of application Ser. No. 08/438,159, filed May 8, 1995, (U.S. Pat. No. 5,850,481), and provisional application Ser. No. 60/082,228, filed Apr. 16, 1998.

(The specification of application Ser. No. 08/438,159 is substantially identical to that of applicant's issued U.S. Pat. Nos. 5,636,292, 5,710,834, 5,748,763, 5,748,783. The specification of application Ser. No. 60/082,228 is attached hereto as Appendix A.)

The subject matter of this application is also related to that of the present assignee's other pending applications, namely Ser. No. 08/508,083 (now U.S. Pat. No. 5,841,978), Ser. No. 08/534,005 (now U.S. Pat. No. 5,832,119), Ser. No. 08/637,531 (now U.S. Pat. No. 5,822,436), Ser. No. 08/649,419 (now U.S. Pat. No. 5,862,260), Ser. 08/746,613 (now U.S. Pat. No. 6,122,403), Ser. No. 08/951,858 (now U.S. Pat. No. 6,026,193), and Ser. No. 08/969,072 (now U.S. Pat. No. 5,809,160), and the allowed applications referenced below.

FIELD OF THE INVENTION

The present invention relates to methods and systems for inconspicuously embedding binary data in line art images (such as are used in currency and the like), and associated methods/systems for decoding such data from such images. One application of such technology is discouraging counterfeiting of banknotes.

BACKGROUND AND SUMMARY OF THE INVENTION

Watermarking is a quickly growing field of endeavor, with several different approaches. The present assignee's work is reflected in U.S. Pat. Nos. 5,710,834, 5,636,292, 5,721,788, 5,748,763, 5,748,783, and 5,745,604, in allowed U.S. applications Ser. No. 08/327,426 (now U.S. Pat. No. 5,768,426), Ser. No. 08/508,093 (now U.S. Pat. No. 5,841,978), U.S. Ser. No. 08/438,159 (now U.S. Pat. No. 5,850,481), and in laid-open PCT application WO97/43736. (The laid-open PCT application is substantially identical to the disclosure of U.S. Pat. No. 6,122,403.) Other work is illustrated by U.S. Pat. Nos. 5,734,752, 5,646,997, 5,659,726, 5,664,018, 5,671,277, 5,687,191, 5,687,236, 5,689,587, 5,568,570, 5,572,247, 5,574,962, 5,579,124, 5,581,500, 5,613,004, 5,629,770, 5,461,426, 5,743,631, 5,488,664, 5,530,759, 5,539,735, 4,943,973, 5,337,361, 5,404,160, 5,404,377, 5,315,098, 5,319,735, 5,337,362, 4,972,471, 5,161,210, 5,243,423, 5,091,966, 5,113,437, 4,939,515, 5,374,976, 4,855,827, 4,876,617, 4,939,515, 4,963,998, 4,969,041, and published foreign applications WO 98/02864, EP 822,550, WO 97/39410, WO 96/36163, GB 2,196,167, EP 777,197, EP 736,860, EP 705,025, EP 766,468, EP 782,322, WO 95/20291, WO 96/26494, WO 96/36935, WO 96/42151, WO 97/22206, WO 97/26733. Some of the foregoing patents relate to visible watermarking techniques. Other visible watermarking techniques (e.g. data glyphs) are described in U.S. Pat. Nos. 5,706,364, 5,689,620, 5,684,885, 5,680,223, 5,668,636, 5,640,647, 5,594,809.

Most of the work in watermarking, however, is not in the patent literature but rather in published research. In addition to the patentees of the foregoing patents, some of the other workers in this field (whose watermark-related writings can by found by an author search in the INSPEC database) include I. Pitas, Eckhard Koch, Jian Zhao, Norishige Morimoto, Laurence Boney, Kineo Matsui, A. Z. Tirkel, Fred Mintzer, B. Macq, Ahmed H. Tewfik, Frederic Jordan, Naohisa Komatsu, and Lawrence O'Gorman.

The artisan is assumed to be familiar with the foregoing prior art.

In the following disclosure it should be understood that references to watermarking encompass not only the assignee's watermarking technology, but can likewise be practiced with any other watermarking technology, such as those indicated above.

Watermarking can be applied to myriad forms of information. The present disclosure focuses on its applications to line art imagery, of the sort typically employed in banknotes, travelers checks, passports, stock certificates, and the like (hereafter collectively referred to as "banknotes"). However, it should be recognized that the principles discussed below can also be applied outside this particular field.

Most of the prior art in image watermarking has focused on pixelated imagery (e.g. bit-mapped images, JPEG/MPEG imagery, VGA/SVGA display devices, etc.). In most watermarking techniques, the luminance or color values of component pixels are slightly changed to effect subliminal encoding of binary data through the image. (This encoding can be done directly in the pixel domain, or in another domain, such as the DCT domain.) In some systems, isolated pixels are changed in accordance with one or more bits of the binary data; in others, plural domain-related groupings of pixels (e.g. locally adjoining, or corresponding to a given DCT component) are so changed. In all cases, however, pixels have served as the ultimate carriers of the embedded data.

While pixelated imagery is a relatively recent development, line art goes back centuries. One familiar example is U.S. paper currency. On the one dollar banknote, for example, line art is used in several different ways. One is to form intricate webbing patterns around the margin of the note (generally comprised of light lines on dark background). Another is so form grayscale imagery, such as the portrait of George Washington (generally comprised of dark lines on a light background).

There are two basic ways to simulate grayscales in line art. One is to change the relative spacings of the lines to effect a lightening or darkening of an image region. FIG. 1A shows such an arrangement; area B looks darker than area A due to the closer spacings of the component lines. The other technique is to change the widths of the component lines— wider lines resulting in darker areas and narrower lines resulting in lighter areas. FIG. 1B shows such an arrangement. Again, area B looks darker than area A, this time due to the greater widths of the component lines. These techniques are often used together.

In my prior applications, I noted that conventional watermarking techniques are unsuitable for use with a type of line art known as vector graphics. (In vector graphics, lines are digitally described by reference to their geometry.) In particular, I noted that a change of even a single bit in a vector graphic can have substantial, unintended effects (e.g. changing a circle to a square), making the subliminal encoding of binary watermark data difficult.

In those prior applications, I proposed various solutions to this problem. One solution was to recognize that the eye is relatively insensitive to the precise placement and/or contours of a line, permitting slight modulation to effect information encoding. In particular, I noted:

"The primary example is the borders and contours between where a given line or figure is drawn or not drawn, or exactly where a bit-map changes from green to blue. In most cases, a human viewer of such graphics will be keenly aware of any attempts to "modulate signature signals" via the detailed and methodical changing of the precise contours of a graphic object. Nevertheless, such encoding of the signatures is indeed possible. The distinction between this approach and that disclosed in the bulk of this disclosure is that now the signatures must ultimately derive from what already exists in a given graphic, rather than being purely and separately created and added into a signal. This disclosure points out the possibilities here nonetheless. The basic idea is to modulate a contour, a touch right or a touch left, a touch up or a touch down, in such a way as to communicate an N-bit identification word. The locations of the changes contours would be contained in a an analogous master noise image, though now the noise would be a record of random spatial shifts one direction or another, perpendicular to a given contour. Bit values of the N-bit identification word would be encoded, and read, using the same polarity checking method between the applied change and the change recorded in the master noise image."

The present disclosure expands on these principles by reference to several illustrative embodiments.

One embodiment posits a virtual grid of points imposed on a line art image (e.g. a U.S. one dollar banknote), with the points spaced at regular intervals in vertical and horizontal directions. (The horizontal and vertical intervals need not be equal.) The virtual points may be imposed over some or all of the bill at equal vertical and horizontal spacings of 250 $\mu$m. In regions of the banknote having line art, the component lines of the art snake in and amongst these virtual grid points.

Each grid point is considered to be the center of a rounded-square region. The luminance of the region is a function of the proximity of any line(s) within the boundary of the region to the region's centerpoint, and the thickness of the line(s).

To change the luminance of the region, the contour of the line(s) is changed slightly within the region. In particular, the line is made slightly thicker to decrease luminance; or thinner to increase luminance. (Unless otherwise noted, dark lines on light backgrounds are presumed.) The ability to effect these slight changes is then employed, in accordance with known pixelation-based watermarking techniques, to encode binary data in the line art. If such a banknote is thereafter scanned by a scanner, the values of the pixel data produced by the scanner will reflect the foregoing alterations in luminance values, permitting embedded watermark data to be decoded.

In an alternative embodiment, the line widths are not changed. Instead, the positions of the lines are shifted slightly towards or away from certain virtual grid points to effect an increase or decrease in the corresponding area's luminosity, with the same effect. Other embodiments are also detailed.

By the techniques disclosed herein, line art images can be encoded to subliminally convey binary data. This capability permits various hardware systems to recognize banknotes, and to change or limit their actions in a predetermined manner (e.g. a photocopier equipped with this capability can refuse to reproduce banknotes, or can insert forensic tracer data in the copy).

The foregoing features and advantages of the invention will be more readily apparent from the following detailed description, which proceeds with reference to the accompanying drawings.

BRIEF DESCRIPTION OF THE DRAWINGS

FIG. 3 shows a virtual array of regions that can be imposed on an image according to the FIG. 2 embodiment.

FIG. 4 shows an excerpt of FIG. 3 with a line from a line art image passing therethrough.

FIG. 5 shows changes to the width of the line of FIG. 3 to effect watermark encoding according to one embodiment of the present invention.

FIG. 6 shows changes to the position of the line of FIG. 3 to effect watermark encoding according to another embodiment of the present invention.

DETAILED DESCRIPTION

Figure 1A:
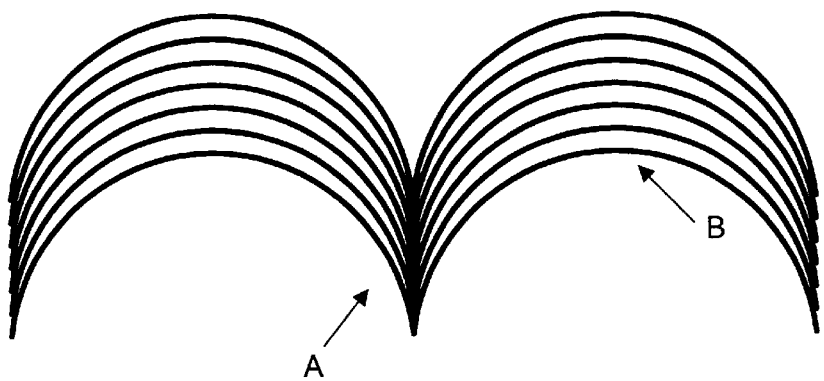
FIGS. 1A and 1B show prior art techniques for achieving grayscale effects using line art.
Figure 1B:
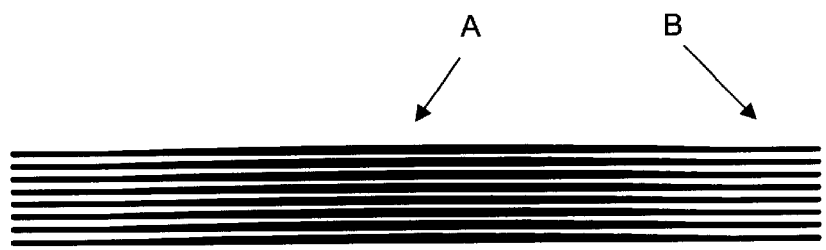
Figure 2:
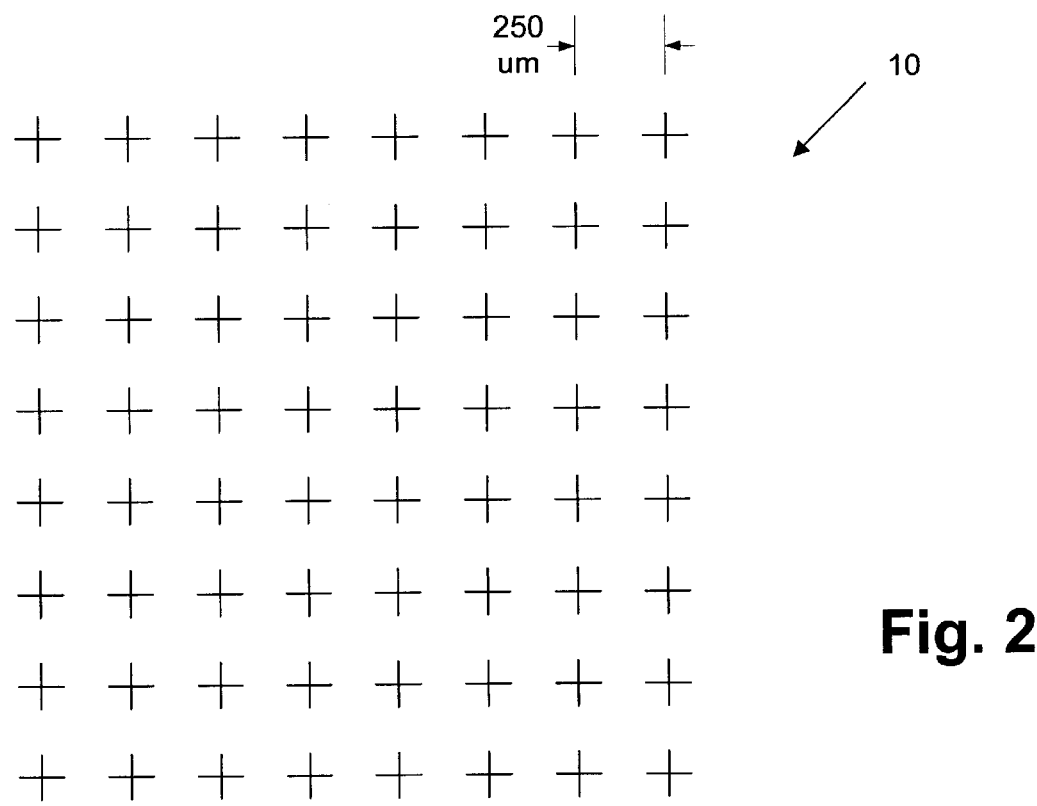
FIG. 2 shows a virtual array of grid points that can be imposed on an image according to one embodiment of the present invention.

Referring to FIG. 2, an illustrative form of the invention employs a grid 10 of imaginary reference points arrayed over a line art image. The spacing between points is 250 $\mu$m in the illustrated arrangement, but greater or lesser spacings can of course be used.

Associated with each grid point is a surrounding region 12, shown in FIG. 3. As described below, the luminosity (or reflectance) of each of these regions 12 is slightly changed to effect the subliminal encoding of binary data.

Region 12 can take various shapes; the illustrated rounded-rectangular shape is representative only. (The illustrated shape has the advantage of encompassing a fairly large area while introducing fewer visual artifacts than, e.g., square regions.) In other embodiments, squares, rectangles, circles, ellipses, etc., can alternatively be employed.

FIG. 4 is a magnified view of an excerpt of FIG. 3, showing a line 14 passing through the grid of points. The width of the line, of course, depends on the particular image of which it is a part. The illustrated line is about 25 $\mu$m in width; greater or lesser widths can naturally be used.

In a first embodiment of the invention, shown in FIG. 5, the width of the line is controllably varied so as to change the luminosity of the regions through which it passes. To increase the luminosity (or reflectance), the line is made narrower (i.e. less ink in the region). To decrease the luminosity, the line is made wider (i.e. more ink).

Whether the luminance in a given region should be increased or decreased depends on the particular watermarking algorithm used. Any algorithm can be used, by changing the luminosity of regions 12 as the algorithm would otherwise change the luminance or colors of pixels in a pixelated image.

In an exemplary algorithm, the binary data is represented as a sequence of −1s and 1s, instead of 0s and 1s. (The binary data can comprise a single datum, but more typically comprises several. In an illustrative embodiment, the data comprises 100 bits.)

Each element of the binary data sequence is then multiplied by a corresponding element of a pseudo-random number sequence, comprised of −1s and 1s, to yield an intermediate data signal. Each element of this intermediate data signal is mapped to a corresponding sub-part of the image, such as a region 12. The image in (and optionally around) this region is analyzed to determine its relative capability to conceal embedded data, and a corresponding scale factor is produced. Exemplary scale factors may range from 0 to 3. The scale factor for the region is then multiplied by the element of the intermediate data signal mapped to the region in order to yield a "tweak" value for the region. In the illustrated case, the resulting tweaks can range from −3 to 3. The luminosity of the region is then adjusted in accordance with the tweak value. A tweak value of −3 may correspond to a −5% change in luminosity; −2 may correspond to −2% change; −1 may correspond to −1% change; 0 may correspond to no change; 1 may correspond to +1% change; 2 may correspond to +2% change, and 3 may correspond to +5% change. (This example follows the basic techniques described in the Real Time Encoder embodiment disclosed in U.S. Pat. No. 5,710,834.)

In FIG. 5, the watermarking algorithm determined that the luminance of region A should be reduced by a certain percentage, while the luminance of regions C and D should be increased by certain percentages.

In region A, the luminance is reduced by increasing the line width. In region D, the luminance is increased by reducing the line width; similarly in region C (but to a lesser extent).

No line passes through region B, so there is no opportunity to change the region's luminance. This is not fatal to the method, however, since the watermarking algorithm redundantly encodes each bit of data in sub-parts spaced throughout the line art image.

The changes to line widths in regions A and D of FIG. 5 are exaggerated for purposes of illustration. While the illustrated variance is possible, most implementations will modulate the line width 3–50% (increase or decrease).

(Many watermarking algorithms routinely operate within a signal margin of about +/−1% changes in luminosity to effect encoding. That is, the "noise" added by the encoding amounts to just 1% or so of the underlying signal. Lines typically don't occupy the full area of a region, so a 10% change to line width may only effect a 1% change to region luminosity, etc. Banknotes are different from photographs in that the art need not convey photorealism. Thus, banknotes can be encoded with higher energy than is used in watermarking photographs, provided the result is still aesthetically satisfactory. To illustrate, localized luminance changes on the order of 10% are possible in banknotes, while such a level of watermark energy in photographs would generally be considered unacceptable. In some contexts, localized luminance changes of 20, 30, 50 or even 100% are acceptable.)

In the illustrated embodiment, the change to line width is a function solely of the tweak to be applied to a single region. Thus, if a line passes through any part of a region to which a tweak of 2% is to be applied, the line width in that region is changed to effect the 2% luminance difference. In variant embodiments, the change in line width is a function of the line's position in the region. In particular, the change in line width is a function of the distance between the region's center grid point and the line's closest approach to that point. If the line passes through the grid point, the full 2% change is effected. At successively greater distances, successively less change is applied. The manner in which the magnitude of the tweak changes as a function of line position within the region can be determined by applying one of various interpolation algorithms, such as the bi-linear, bi-cubic, cubic splines, custom curve, etc.

In other variant embodiments, the change in line width in a given region is a weighted function of the tweaks for adjoining or surrounding regions. Thus, the line width in one region may be increased or decreased in accordance with a tweak value corresponding to one or more adjoining regions.

Combinations of the foregoing embodiments can also be employed.

In the foregoing embodiments, it is sometimes necessary to trade-off the tweak values of adjoining regions. For example, a line may pass along a border between regions, or pass through the point equidistant from four grid points ("equidistant zones"). In such cases, the line may be subject to conflicting tweak values—one region may want to increase the line width, while another may want to decrease the line width. (Or both may want to increase the line width, but differing amounts.) Similarly in cases where the line does not pass through an equidistant zone, but the change in line width is a function of a neighborhood of regions whose tweaks are of different values. Again, known interpolation functions can be employed to determine the weight to be given the tweak from each region in determining what change is to be made to the line width in any given region.

In the exemplary watermarking algorithm, the average change in luminosity across the image is zero, so no generalized lightening or darkening of the image is apparent. The localized changes in luminosity are so minute in magnitude, and localized in position, that they are essentially invisible (e.g. inconspicuous/subliminal) to human viewers.

An alternative embodiment is shown in FIG. 6, in which line position is changed rather than line width.

In FIG. 6 the original position of the line is shown in dashed form, and the changed position of the line is shown in solid form. To decrease a region's luminosity, the line is moved slightly closer to the center of the grid point; to increase a region's luminosity, the line is moved slightly away. Thus, in region A, the line is moved towards the center grid point, while in region D it is moved away.

It will be noted that the line on the left edge of region A does not return to its nominal (dashed) position as it exits the region. This is because the region to the left of region A also is to have decreased luminosity. Where possible, it is generally preferable not to return a line to its nominal position, but instead permit shifted lines to remain shifted as they enter adjoining regions. So doing permits a greater net line movement within a region, increasing the embedded signal level.

Again, the line shifts in FIG. 6 are somewhat exaggerated. More typical line shifts are on the order of 3–50 µm.

One way to think of the FIG. 6 embodiment is to employ a magnetism analogy. The grid point in the center of each region can be thought of as a magnet. It either attracts or repels lines. A tweak value of −3, for example, may correspond to a strong-valued attraction force; a tweak value of +2 may correspond to a middle-valued repulsion force, etc. In FIG. 6, the grid point in region A exhibits an attraction force (i.e. a negative tweak value), and the grid point in region D exhibits a repulsion force (e.g. a positive tweak value).

The magnetic analogy is useful because the magnetic effect exerted on a line depends on the distance between the line and the grid point. Thus, a line passing near a grid point is shifted more in position than a line near the periphery of the region.

Each of the variants discussed above in connection with FIG. 5 is likewise applicable to FIG. 6.

Combinations of the embodiments of FIGS. 5 and 6 can of course be used, resulting in increased watermark energy, better signal-to-noise ratio and, in many cases, less noticeable changes.

In still a further embodiment, the luminance in each region is changed while leaving the line unchanged. This can be effected by sprinkling tiny dots of ink in the otherwise-vacant parts of the region. In high quality printing, of the type used with banknotes, droplets on the order of 31 m in diameter can be deposited. (Still larger droplets are still beyond the perception threshold for most viewers.) Speckling a region with such droplets (either in a regular array, or random, or according to a desired profile such as Gaussian), can readily effect a 1% or so change in luminosity. (Usually dark droplets are added to a region, effecting a decrease in luminosity. Increases in luminosity can be effected by speckling with a light colored ink, or by forming light voids in line art otherwise present in a region.)

In a variant of the speckling technique, very thin mesh lines can be inserted in the artwork—again to slightly change the luminance of one or more regions.

Although not previously mentioned, it is contemplated that the banknote will include some manner of calibration information to facilitate registration of the image for decoding. This calibration information can be steganographic or overt. Several techniques for steganographically embedding calibration information are disclosed in my prior patents and applications. Other techniques can be found in others of the cited work.

To decode watermark data, the encoded line art image must be converted into electronic form for analysis. This conversion is typically performed by a scanner.

Scanners are well known, so a detailed description is not provided here. Suffice it to say that scanners conventionally employ a line of closely spaced photodetector cells that produce signals related to the amount of the light reflected from successive swaths of the image. Most inexpensive consumer scanners have a resolution of 300 dots per inch (dpi), or a center to center spacing of component photodetectors of about 84 $\mu$m. Higher quality scanners of the sort found in most professional imaging equipment and photocopiers have resolutions of 600 dpi (42 $\mu$m), 1200 dpi (21 $\mu$m), or better.

Taking the example of a 300 dpi scanner (84 $\mu$m photodetector spacing), each 250 $\mu$m region 12 on the banknote will correspond to about a 3×3 array of photodetector samples. Naturally, only in rare instances will a given region be physically registered with the scanner so that nine photodetector samples capture the luminance in that region, and nothing else. More commonly, the line art is skewed with respect to the scanner photodetectors, or is longitudinally misaligned (i.e. some photodetectors image sub-parts of two adjoining regions). However, since the scanner oversamples the regions, the luminance of each region can unambiguously be determined.

In one embodiment, the scanned data from the line art is collected in a two dimensional array and processed—according to one of the techniques disclosed in my prior patents and applications—to detect the embedded calibration information. The array is then processed to effect a virtual re-registration of the image data. A software program then analyzes the statistics of the re-registered data (using the techniques disclosed in my prior writings) to extract the bits of the embedded data.

(Again, the reference to my earlier watermark decoding techniques is exemplary only. Once scanning begins and the data is available in pixel form, it is straight forward to apply any other watermark decoding technique to extract a correspondingly-encoded watermark.)

In a variant embodiment, the scanned data is not assembled in a complete array prior to the processing. Instead, it is processed in real-time, as it is generated, in order to detect embedded watermark data without delay. (Depending on the parameters of the scanner, it may be necessary to scan a half-inch or so of the line art image before the statistics of the resulting data unambiguously indicate the presence of a watermark.)

In accordance with another aspect of the invention, various hardware devices are provided with the capability to recognize embedded watermark data in any line art images they process, and to respond accordingly.

One example is a color photocopier. Such devices employ a color scanner to generate sampled (pixel) data corresponding to an input media (e.g. a dollar bill). If watermark data associated with a banknote is detected, the photocopier can take one or more steps.

One option is simply to interrupt copying, and display a message reminding the operator that it is illegal to reproduce currency.

Another option is to dial a remote service and report the attempted reproduction of a banknote. Photocopiers with dial-out capabilities are known in the art (e.g. U.S. Pat. No. 5,305,199) and are readily adapted to this purpose. The remote service can be an independent service, or can be a government agency.

Figure 7:
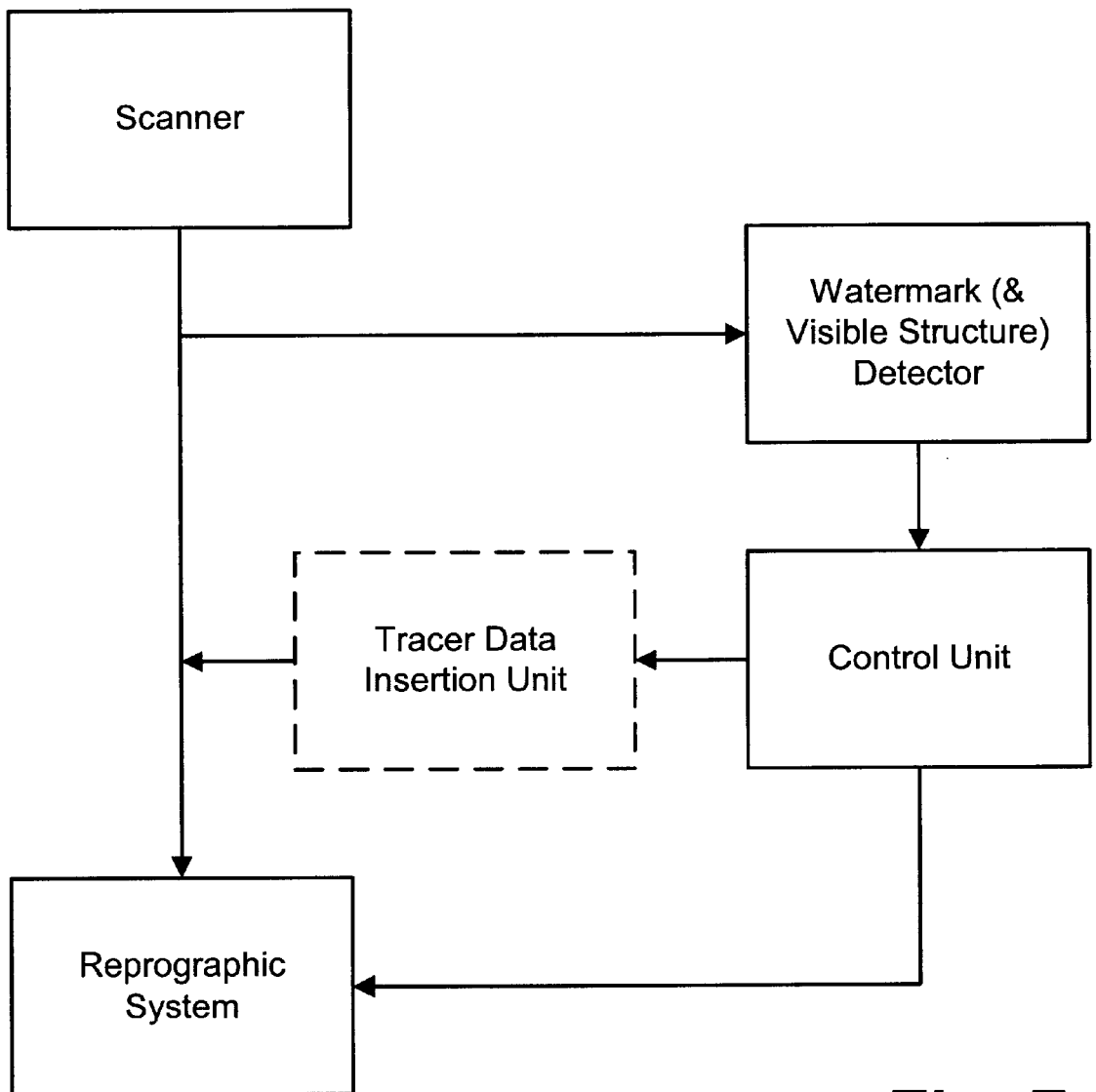
FIG. 7 is a block diagram of a photocopier according to another embodiment of the invention.

Yet another option is to permit the copying, but to insert forensic tracer data in the resultant copy. This tracer data can take various forms. Steganographically encoded binary data is one example. An example is shown in U.S. Pat. No. 5,568,268. The tracer data can memorialize the serial number of the machine that made the copy and/or the date and time the copy was made. To address privacy concerns, such tracer data is not normally inserted in photocopied output, but is so inserted only when the subject being photocopied is detected as being a banknote. (Such an arrangement is shown in FIG. 7.)

Desirably, the scan data is analyzed on a line-by-line basis in order to identify illicit photocopying with a minimum of delay. If a banknote is scanned, one or more lines of scanner output data may be provided to the photocopier's reprographic unit before the banknote detection decision has been made. In this case the photocopy will have two regions: a first region that is not tracer-marked, and a second, subsequent region in which the tracer data has been inserted.

Photocopiers with other means to detect not-to-be-copied documents are known in the art, and employ various response strategies. Examples are detailed in U.S. Pat. Nos. 5,583,614, 4,723,149, 5,633,952, 5,640,467, and 5,424,807.

Another hardware device that can employ the foregoing principles is a standalone scanner. A programmed processor (or dedicated hardware) inside the scanner analyzes the data being generated by the device, and responds accordingly.

Yet another hardware device that can employ the foregoing principles is a printer. A processor inside the device analyzes graphical image data to be printed, looking for watermarks associated with banknotes.

For both the scanner and printer devices, response strategies can include disabling operation, or inserting tracer information. (Such devices typically do not have dial-out capabilities.)

Again, it is desirable to process the scanner or printer data as it becomes available, so as to detect any banknote processing with a minimum of delay. Again, there will be some lag time before a detection decision is made. Accordingly, the scanner or printer output will be comprised of two parts, one without the tracer data, and another with the tracer data.

Banknotes presently include various visible structures that can be used as aids in banknote detection (e.g. the seal of the issuing central bank, and various geometrical markings). In accordance with a further aspect of the present invention, a banknote is analyzed by an integrated system that considers both the visible structures and watermark-embedded data.

Visible banknote structures can be sensed using known pattern recognition techniques. Examples of such techniques are disclosed in U.S. Pat. Nos. 5,321,773, 5,390,259, 5,533,144, 5,539,841, 5,583,614, 5,633,952, 4,723,149 and 5,424,807 and laid-open foreign application EP 766,449.

In photocopiers (and the like) equipped to detect both visible and watermarked banknote markings, the detection of either causes one or more of the above-noted banknote responses to be initiated.

Again, scanners and printers can be equipped with a similar capability—analyzing the data for either of these banknote hallmarks. If either is detected, the software (or hardware) responds accordingly.

Identification of banknotes by watermark data provides an important advantage over recognition by visible structures—it cannot so easily be defeated. A banknote can be doctored (e.g. by white-out, scissors, or less crude techniques) to remove/obliterate the visible structures. Such a document can then be freely copied on either a visible structure-sensing photocopier or scanner/printer installation. The removed visible structure can then be added in via a second printing/photocopying operation. If the printer is not equipped with banknote-disabling capabilities, image-editing tools can be used to insert visible structures back into image data sets scanned from such doctored bills, and the complete bill freely printed. By additionally including embedded watermark data in the banknote, and sensing same, such ruses will not succeed.

(A similar ruse is to scan a banknote image on a non-banknote-sensing scanner. The resulting image set can then be edited by conventional image editing tools to remove/obliterate the visible structures. Such a data set can then be printed—even on a printer/photocopier that examines such data for the presence of visible structures. Again, the missing visible structures can be inserted by a subsequent printing/photocopying operation.)

Desirably, the visible structure detector and the watermark detector are integrated together as a single hardware and/or software tool. This arrangement provides various economies, e.g., in interfacing with the scanner, manipulating pixel data sets for pattern recognition and watermark extraction, electronically re-registering the image to facilitate pattern recognition/watermark extraction, issuing control signals (e.g. disabling) signals to the photocopier/scanner, etc.

(To provide a comprehensive disclosure without unduly lengthening the following specification, applicants incorporate by reference the patent documents cited above.)

From the foregoing, it will be recognized that embodiments according to the present invention allow line art images to serve as subliminal carriers for binary data. Additionally, existing deterrents to banknote counterfeiting have been enhanced to prevent common work-arounds.

Having described and illustrated the principles of my invention with reference to several illustrative embodiments, it will be recognized that these embodiments are exemplary only and should not be taken as limiting the scope of my invention. Guided by the foregoing teachings, it should be apparent that other watermarking, decoding, and anti-counterfeiting technologies can be substituted for, and/or combined with, the elements detailed above to yield similar effects.

While the invention has been described with reference to embodiments employing regular rectangular arrays of grid points, those skilled in the art will recognize that other arrays of points—neither rectangular nor regular—can alternatively be used.

While the invention has been described with reference to embodiments that scale the embedded energy in accordance with local image characteristics, in other embodiments a manually crafted energy profile can be implemented. That is, a mask defining embedded signal magnitudes at different parts of the image can be manually devised, and employed to tailor the change in luminance in each region.

In view of the many possible embodiments to which the principles of the invention may be put, it should be recognized that the detailed embodiments are illustrative only and should not be taken as limiting the scope of my invention. Rather, I claim as my invention all such embodiments as may come within the scope and spirit of the following claims and equivalents thereto.

I claim:

1. A method of embedding binary data in a banknote, comprising:

providing nominal line art for the banknote;

imposing a virtual grid of points over at least an excerpt of said line art, each of said points having a region associated therewith; and changing a luminance value of plural of said regions to embed binary data therein, wherein said changes are not apparent to a human viewer of the banknote, yet can be detected from visible light scan data corresponding to said banknote.

2. A banknote produced by the process of claim 1.

3. A method of embedding binary data in a banknote, comprising:

providing nominal line art for the banknote;

imposing a virtual grid of points over at least an excerpt of said line art, each of said points having a region associated therewith; and changing a luminance value of plural of said regions to embed binary data therein by modulating the width of plural lines in said line art imagery.

4. A banknote produced by the process of claim 3.

5. A method of embedding binary data in a banknote, comprising:

providing nominal line art for the banknote;

imposing a virtual grid of points over at least an excerpt of said line art, each of said points having a region associated therewith; and changing a luminance value of plural of said regions to embed binary data therein by modulating the position of plural lines in said line art imagery.

6. A banknote produced by the process of claim 5.

7. A method of embedding binary data in a banknote, comprising:

providing nominal line art for the banknote;

imposing a virtual grid of points over at least an excerpt of said line art, each of said points having a region associated therewith; and changing a luminance value of plural of said regions to embed binary data therein by inserting new lines in said line art.

8. A banknote produced by the process of claim 7.

* * * * *